(12) United States Patent
Nambu

(10) Patent No.: US 11,853,658 B2
(45) Date of Patent: Dec. 26, 2023

(54) INFORMATION PROCESSING APPARATUS, INFORMATION PROCESSING METHOD, AND NON-TRANSITORY COMPUTER READABLE MEDIUM

(71) Applicant: NEC Corporation, Tokyo (JP)

(72) Inventor: Yoshihiro Nambu, Tokyo (JP)

(73) Assignee: NEC CORPORATION, Tokyo (JP)

(*) Notice: Subject to any disclaimer, the term of this patent is extended or adjusted under 35 U.S.C. 154(b) by 287 days.

(21) Appl. No.: 17/125,101

(22) Filed: Dec. 17, 2020

(65) Prior Publication Data

US 2021/0192108 A1    Jun. 24, 2021

(30) Foreign Application Priority Data

Dec. 20, 2019  (JP) ................................ 2019-230591

(51) Int. Cl.
    *G06F 30/20*     (2020.01)
    *G06F 17/16*     (2006.01)
    *G06N 7/08*      (2006.01)
    *G06F 111/10*    (2020.01)

(52) U.S. Cl.
    CPC .............. *G06F 30/20* (2020.01); *G06F 17/16* (2013.01); *G06N 7/08* (2013.01); *G06F 2111/10* (2020.01)

(58) Field of Classification Search
    CPC ...... G06F 30/20; G06F 17/16; G06F 2111/10; G06N 7/08
    See application file for complete search history.

(56) References Cited

U.S. PATENT DOCUMENTS

2015/0032994 A1*  1/2015  Chudak .................. G06N 10/00
                                                              712/42
2021/0117188 A1*  4/2021  Okuyama .............. G06N 7/005

FOREIGN PATENT DOCUMENTS

WO       2017/037859 A1       3/2017

OTHER PUBLICATIONS

JP Office Action for JP Application No. 2019-230591, dated Oct. 31, 2023 with English Translation.
Sasaki et al, "On Initial-Point Dependence of Hopfield Network for Solving Traveling Salesman Problem", The transactions of the Institute of Electronics, Information and Communication Engineers, (J82-A) No. 7, Jul. 25, 1999, pp. 1, Japan.

* cited by examiner

*Primary Examiner* — Chuen-Meei Gan

(57) ABSTRACT

The present disclosure provides an information processing apparatus capable of improving the accuracy of solving a problem when an annealing algorithm is executed. An information processing apparatus 1 includes a calculation unit 2 and an arithmetic unit 4. The calculation unit 2 calculates at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm. The arithmetic unit 4 executes the annealing algorithm from an initial state set based on the at least one eigenvector.

13 Claims, 11 Drawing Sheets

INFORMATION PROCESSING APPARATUS, INFORMATION PROCESSING METHOD, AND NON-TRANSITORY COMPUTER READABLE MEDIUM

INCORPORATION BY REFERENCE

This application is based upon and claims the benefit of priority from Japanese patent application No. 2019-230591, filed on Dec. 20, 2019, the disclosure of which is incorporated herein in its entirety by reference.

TECHNICAL FIELD

The present disclosure relates to an information processing apparatus, an information processing method, and a program.

BACKGROUND ART

An annealing algorithm (an annealing method) for solving a problem of determining a ground state of an Ising model, such as quantum annealing or simulated annealing, is known. For example, International Patent Publication No. WO 2017/037859 discloses an information processing apparatus that executes arithmetic processing for obtaining a solution of an optimization problem by determining a ground state of an Ising model.

In the technique disclosed in International Patent Publication No. WO 2017/037859, an initial state of a spin arrangement in the Ising model is randomly set by random numbers and then a simulated annealing algorithm is executed. If the initial state is set randomly, it is more likely that a state far from the ground state is set as an initial state. Accordingly, the accuracy of solving a problem may be deteriorated. Therefore, a method for improving the accuracy of solving a problem when an annealing algorithm is executed is desired.

The present disclosure has been made to solve the above-described problem and an object thereof is to provide an information processing apparatus, an information processing method, and a program that are capable of improving the accuracy of solving a problem when an annealing algorithm is executed.

SUMMARY

An information processing apparatus according to the present disclosure includes: calculation means for calculating at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and arithmetic means for executing the annealing algorithm from an initial state determined based on the at least one eigenvector.

Further, an information processing method according to the present disclosure includes: calculating at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and executing the annealing algorithm from an initial state determined based on the at least one eigenvector.

A program according to the present disclosure causes a computer to: calculate at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and execute the annealing algorithm from an initial state determined based on the at least one eigenvector.

According to the present disclosure, it is possible to provide an information processing apparatus, an information processing method, and a program that are capable of improving the accuracy of solving a problem when an annealing algorithm is executed.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Overview of Example Embodiments According to Present Disclosure

Figure 1:
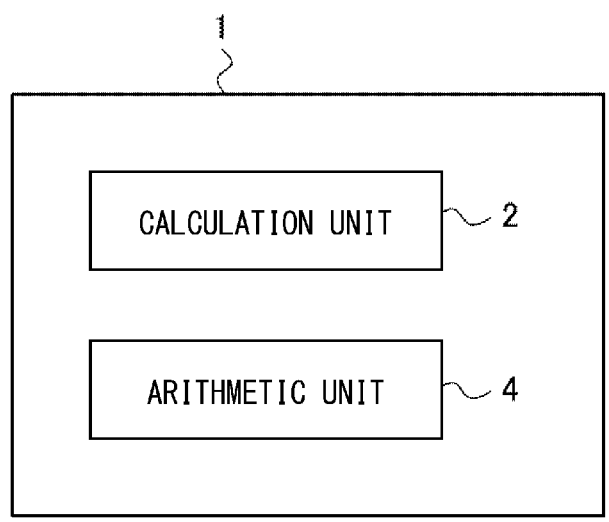
FIG. 1 shows an overview of an information processing apparatus according to example embodiments of the present disclosure.

Prior to describing example embodiments according to the present disclosure in detail, an overview of the example embodiments is given. FIG. 1 shows an overview of an information processing apparatus 1 according to the example embodiments of the present disclosure. The information processing apparatus 1 has a function, for example, as a computer.

The information processing apparatus 1 includes a calculation unit 2 that functions as calculation means and an arithmetic unit 4 that functions as arithmetic means. The calculation unit 2 calculates at least one eigenvector of a coupling coefficient matrix given in advance in accordance with a problem to be solved by an annealing algorithm. Here, the coupling coefficient matrix includes a coupling coefficient that indicates a strength of interaction between each of a plurality of binary variables indicating states of spins in an Ising model. The details of the binary variable and the coupling coefficient matrix will be described later. The arithmetic unit 4 executes an annealing algorithm from an initial state (an initial value) determined based on the at least one eigenvector.

As described above, the information processing apparatus 1 executes an annealing algorithm from an initial state determined based on an eigenvector of a coupling coefficient matrix. By doing so, the accuracy of solving a problem is improved as compared to the case where the initial state is set randomly. Note that even when an information processing method performed by the information processing apparatus 1 is used, the accuracy of solving a problem is improved as compared to the case where the initial state is randomly set by random numbers. Further, even when a program capable of performing the information processing method is used, the accuracy of solving a problem is improved as compared to the case where the initial state is chosen randomly.

First Example Embodiment

The example embodiments will be described hereinafter with reference to the drawings. For the clarification of the explanation, the following descriptions and the drawings are partially omitted or simplified as appropriate. Further, the same symbols are assigned to the same elements throughout the drawings, and redundant descriptions are omitted as necessary.

Figure 2:
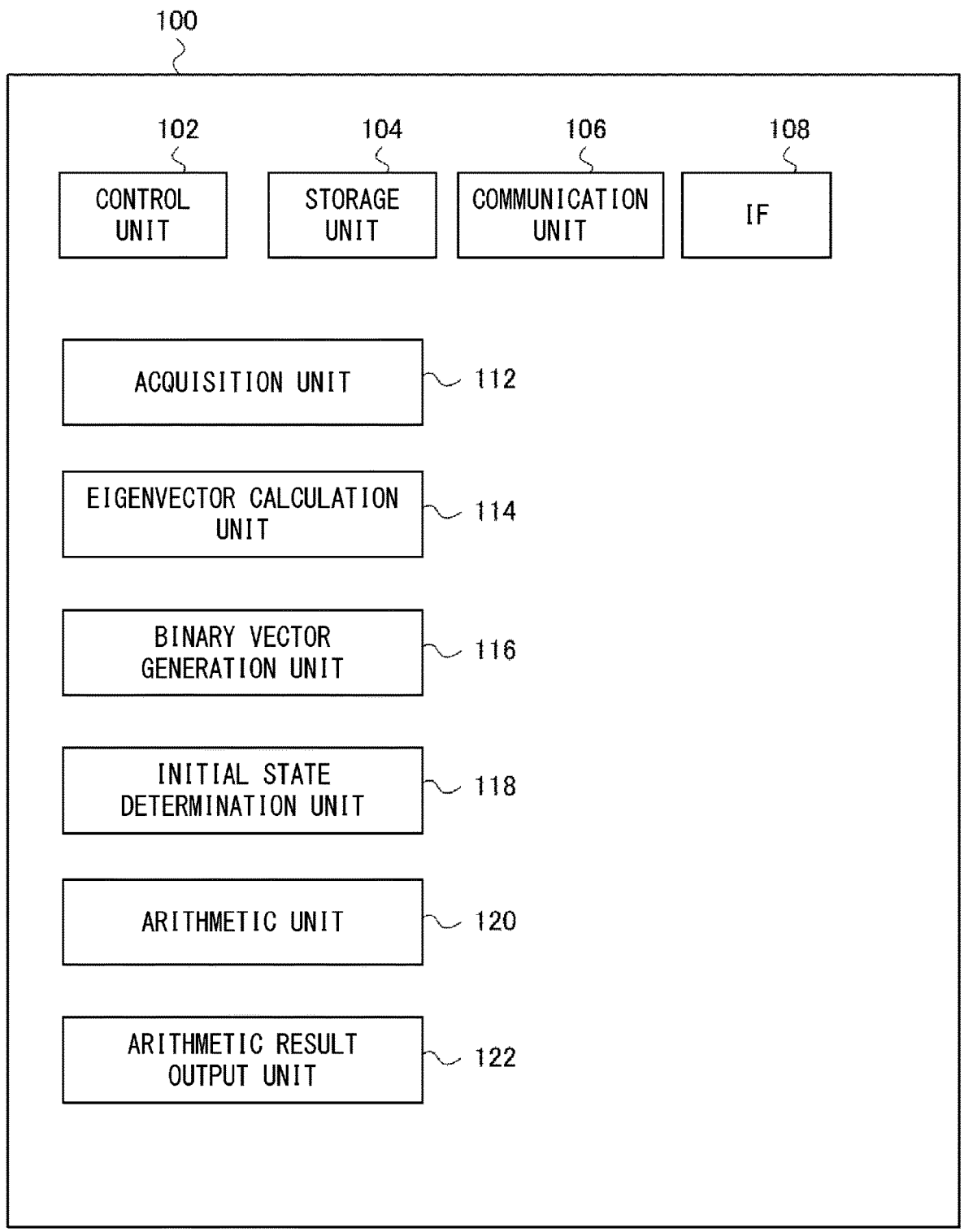
FIG. 2 is a diagram showing a configuration of an information processing apparatus according to a first example embodiment.

FIG. 2 is a diagram showing a configuration of an information processing apparatus 100 according to a first example embodiment. The information processing apparatus 100 corresponds to the information processing apparatus 1 shown in FIG. 1. The information processing apparatus 100 includes, as a main hardware configuration, a control unit 102, a storage unit 104, a communication unit 106, and an interface unit 108 (IF). The control unit 102, the storage unit 104, the communication unit 106, and the interface unit 108 are connected to each other via a data bus or the like.

The control unit 102 is, for example, a processor such as a Central Processing Unit (CPU). The control unit 102 has a function of executing control processing, arithmetic processing, and the like. The storage unit 104 is a storage device such as a memory or a hard disk. The storage unit 104 is, for example, a Read Only Memory (ROM) or a Random Access Memory (RAM). The storage unit 104 has a function of storing a control program, an arithmetic program, and the like to be executed by the control unit 102. Further, the storage unit 104 has a function of temporarily storing processing data and the like. The storage unit 104 may include a database.

The communication unit 106 performs processing required to communicate with other devices via a wired or wireless network. The communication unit 106 may include a communication port, a router, a firewall, and the like. The interface unit 108 is, for example, a user interface (UI). The interface unit 108 includes an input device such as a keyboard, a touch panel, or a mouse, and an output device such as a display or a speaker. The interface unit 108 receives a data input operation performed by a user and outputs information to the user.

Further, the information processing apparatus 100 includes an acquisition unit 112, an eigenvector calculation unit 114, a binary vector generation unit 116, an initial state determination unit 118, an arithmetic unit 120, and an arithmetic result output unit 122. Note that in the following descriptions, each of the acquisition unit 112, the eigenvector calculation unit 114, the binary vector generation unit 116, the initial state determination unit 118, the arithmetic unit 120, and the arithmetic result output unit 122 may be referred to as a "component".

The acquisition unit 112 has a function as acquisition means. The eigenvector calculation unit 114 has a function as eigenvector calculation means (calculation means). The binary vector generation unit 116 has a function as binary vector generation means (generation means). The initial state determination unit 118 has a function as initial state determination means (determination means). The arithmetic unit 120 has a function as arithmetic means. The arithmetic result output unit 122 has a function as arithmetic result output means (output means). Further, the eigenvector calculation unit 114 and the arithmetic unit 120 correspond to the calculation unit 2 and the arithmetic unit 4 shown in FIG. 1, respectively. Note that processing of each of these components will be described later with reference to FIG. 4.

Note that each component can be implemented, for example, by executing a program under the control of the control unit 102. More specifically, each component can be implemented by the control unit 102 executing a program stored in the storage unit 104. Further, each component may be implemented by installing a necessary program stored in any nonvolatile recording medium as required. Further, each component is not necessarily implemented by software executed by a program, and may instead be implemented, for example, by any combination of hardware, firmware, and software. Further, each component may also be implemented using a user-programmable integrated circuit, such as a field-programmable gate array (FPGA) or a Micro Computer. In this case, a program composed of each of the aforementioned components may be implemented by using this integrated circuit.

<Principle>

A principle for improving the accuracy of solving a combinatorial optimization problem performed by the information processing apparatus 100 according to this example embodiment is described below. The combinatorial optimization problem is equivalent to a problem of obtaining σ that minimizes energy H expressed by the following Expression 1. In other words, the combinatorial optimization problem is equivalent to a problem of obtaining the lowest energy state (a ground state) of an Ising model to which the energy H is given in Expression 1.

$$H = -\sum_{i=1}^{N} h_i \hat{\sigma}_i - \sum_{i,j=1}^{N} J_{ij} \hat{\sigma}_i \hat{\sigma}_j = -\sum_{i,j=0}^{N} J_{ij} \sigma_i \sigma_j = -{}^t\sigma J \sigma \quad \text{(Expression 1)}$$

Here, the rightmost side σ of Expression 1 is a vector defined by the following Expression 2. Further, $\sigma_i$ (and $\sigma_j$) is an element of σ.

$$\Sigma = \{\sigma | \sigma_i \in (-1, +1), i = 0, 1, \ldots, N\} \quad \text{(Expression 2)}$$

Here, $\sigma_i$ is a binary parameter (a binary variable; a state parameter) indicating a spin state (an Ising spin) of a node (a lattice point) i in the Ising model. As expressed in Expression 2, $\sigma_i$ has a value of either −1 or +1. Further, N is the number of nodes. Here, as $\sigma_i$ has a value of either −1 or +1, a vector σ is indicated by an element of a set of vertices of an N-dimensional hypercube (or a square if N=2 and a cube if N=3).

H in Expression 1 indicates energy (a cost function to be minimized) in the Ising model. Further, Σ in Expression 2 indicates a domain of a vector (a binary variable vector) $\sigma = \{\sigma_0, \sigma_1, \ldots, \sigma_i, \ldots, \sigma_N\}$ of the binary variable in the Ising model, and is a set of vertices of a hypercube. In other words, the vector σ indicates a combination of the binary variables (the state parameters) of each node i.

Note that in regard to a transformation from the second term on the right side to the third term on the right side in Expression 1, by the energy H (i.e., Expression 1) corresponding to the following Expressions 3 and 4, the energy H can be expressed in the form ($H = -\Sigma J_{ij}\sigma_i\sigma_j$) of the third term on the right side without loss of generality.

$$h_i = J_{0i} \quad \text{(Expression 3)}$$

$$\hat{\sigma}_i = \sigma_0 \sigma_i \ (i=1, \ldots, N) \quad \text{(Expression 4)}$$

Here, $J_{ij}$ in Expression 1 is a coupling coefficient (a coupling constant) indicating a strength of interaction between $\sigma_i$ and $\sigma_j$. $J_{ij}$ indicates, for example, a distance between the node i and the node j, or a weight therebetween. Further, J on the rightmost side of Expression 1 is a coupling coefficient matrix including the coupling coefficient $J_{ij}$. That is, the coupling coefficient matrix J is a matrix (N×N matrix) having the coupling coefficient $J_{ij}$ as an element. Further, $J_{ii}=0$ and $J_{ij}=J_{ji}$. Thus, the coupling coefficient matrix J is a real symmetric matrix where the diagonal term=0. Further, the coupling coefficient matrix J is given in advance in accordance with a problem to be solved by an annealing algorithm. That is, if the combinatorial optimization problem to be solved is determined, the coupling coefficient matrix J is uniquely determined.

The information processing apparatus 100 according to this example embodiment obtains σ that minimizes the energy H expressed by Expression 1 under the constraint expressed by Expression 2 by using an annealing algorithm such as a simulated annealing algorithm. In general, σ that minimizes H cannot be solved analytically. Therefore, the information processing apparatus 100 searches for a solution by probabilistically sampling the solution. For example, a simulated annealing algorithm based on a Monte Carlo method is executed.

Next, the above Expressions 1 and 2, respectively, are replaced by the problem of obtaining x that minimizes the energy H as expressed by the following Expressions 5 and 6.

$$H = -\sum_{i,j=0}^{N} J_{ij} x_i x_j = -{}^t x J x \quad \text{(Expression 5)}$$

Here, x on the rightmost side of Expression 5 is a real vector constrained to a bounded domain X defined by the following Expression 6. Further, $x_i$ (and $x_j$) is an element of x. Here, x corresponds to a vector in which the constraint of σ is relaxed. Thus, $x_i$ corresponds to $\sigma_i$.

$$X = \{x | -1 \le x_i \le +1, i=0,1,\ldots, N\} \quad \text{(Expression 6)}$$

In Expression 6, X indicates the domain of the real vector $x = \{x_0, x_1, \ldots, x_i, \ldots, x_N\}$, which is a set of interior points of a hypercube. That is, in the problems expressed by Expressions 5 and 6, the domain is relaxed by replacing σ with x. That is, while $\sigma_i$ can have only a binary value of −1 or +1, $x_i$ can have a value other than a binary value of −1 or +1. Note that $H = -{}^t x J x$ (Expression 5) does not have an extreme value in X. Therefore, the global optimum solution that gives the minimum value of the relaxation problem expressed by Expressions 5 and 6 coincides with the global optimum solution of the original combinatorial optimization problem (Expressions 1 and 2), and is on the vertex of a hypercube. Note that Expressions 5 and 6 are referred to as continuous relaxation problems in which the domains of Expressions 1 and 2 are replaced with continuous real variables from discrete integer variables. In general, as well as Expressions 1 and 2, Expressions 5 and 6 cannot be solved analytically.

Here, in the continuous relaxation problem, consider that a point (the minimum point) where H is minimized on a hypersphere inscribed in the hypercube related to Expression 2 is an initial value. Therefore, x is constrained to a point $|x|^2 = N$ on the hypersphere inscribed in the hypercube. As described above, the coupling coefficient matrix J is a real symmetric (a positive-semidefinite value) matrix having a diagonal term=0. Here, x that gives the minimum value of H on this hypersphere is equal to a vector x* that gives the maximum value of a Rayleigh quotient for a quadratic form ${}^t x J x$, which is expressed by the following Expression 7.

$$\frac{{}^t x J x}{|x|^2} \quad \text{(Expression 7)}$$

Further, the vector x* (i.e., the minimum point on the hypersphere) that gives the maximum value of Expression 7 is obtained as an eigenvector corresponding to the maximum eigenvalue of the matrix J. Therefore, by using the eigenvector of $$\tilde{x}^* \quad \text{(Expression 8)}$$

for the maximum eigenvalue $\lambda_{max}$ of J which is a real symmetric matrix, it is possible to analytically indicate the following Expression 9.

$$x^* = \sqrt{N}\tilde{x}^* \quad \text{(Expression 9)}$$

Note that in the following descriptions, Expression 8 is sometimes referred to as "~x*".

Further, considering that $H=-^t xJx$ (Expression 5) does not have an extreme value in X, it is estimated that the vertex $$\sigma^* = \text{sgn } x^* = \text{sgn } \tilde{x}^* \quad \text{(Expression 10)}$$

of the hypercube closest to x* can give an approximate solution of the original combinatorial optimization problem (Expressions 1 and 2) by the continuous relaxation problem (Expressions 5 and 6).

Therefore, by calculating the eigenvector ~x* of the coupling coefficient matrix J and using the vector σ* (the approximate solution) obtained by Expression 10 as the initial value (the initial state) in the search for the solution of the annealing algorithm, it is estimated that the solution can be efficiently and accurately obtained. That is, as compared to the case where the initial state is chosen randomly, the initial state can be chosen so as to be close to the ground state, whereby it is estimated that the accuracy of solving a problem can be improved. Note that processing for calculating the vector σ (hereinafter may be referred to as "σ⁰") to be set as the initial value (the initial state) is referred to as "preprocessing" in the sense of processing before the annealing algorithm.

Figure 3:
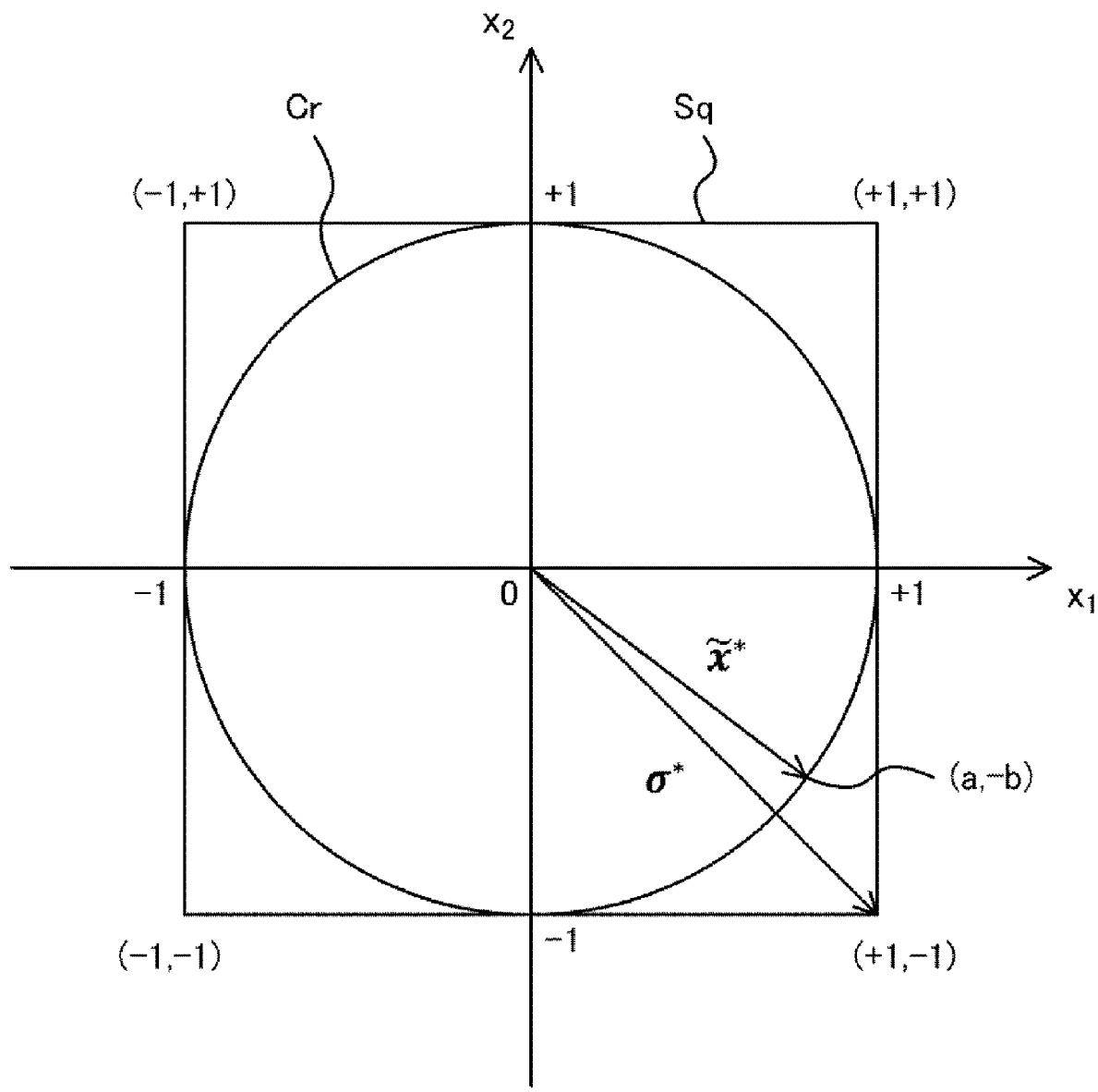
FIG. 3 is a diagram for explaining a continuous relaxation problem according to the example embodiment.

FIG. 3 is a diagram for explaining the continuous relaxation problem according to this example embodiment. In FIG. 3, for the purpose of explanation, it is assumed that N=2, and a two-dimensional space expressed by an $x_1 x_2$ plane is considered. In this case, from Expression 2, the vector σ (i.e., $\{\sigma_1, \sigma_2\}$) can be expressed by any one of the vertices (1, 1), (1, −1), (−1, 1), and (−1, −1) of a square Sq which is a two-dimensional hypercube. Meanwhile, from Expression 6, a point inside or on the circumference of Cr, which is a circle inscribed in the square Sq, is included in the domain X of the vector x (i.e., $\{x_1, x_2\}$).

Here, as described above, the minimum point on the sphere is obtained as an eigenvector corresponding to the maximum eigenvalue of the matrix J. Therefore, the minimum point on an inscribed circle Cr is obtained as the eigenvector corresponding to the maximum eigenvalue of the matrix J. For example, assume that the eigenvector ~x* corresponding to the maximum eigenvalue of the matrix J is expressed by (a, −b), where 0≤a and b≤1. In this case, from Expression 10, the vector σ* is expressed by (+1, −1). This means that the vertex of the square Sq closest to the point (a, −b) is (+1, −1). In this case, the initial value (the initial state) of the binary variable of the annealing algorithm is chosen to σ⁰=(+1, −1).

<Information Processing Method>

Figure 4:
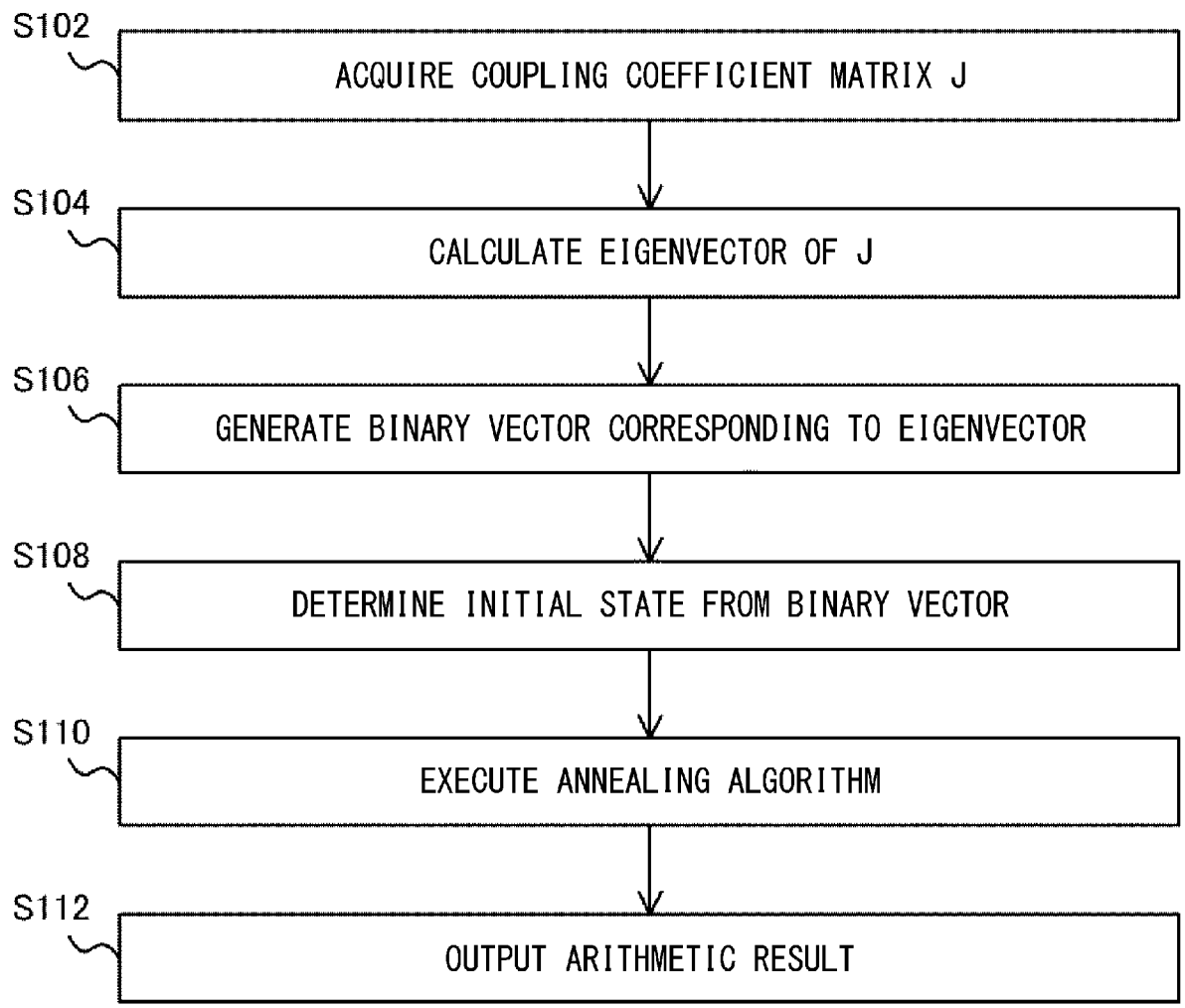
FIG. 4 is a flowchart showing an information processing method performed by the information processing apparatus according to the example embodiment.

FIG. 4 is a flowchart showing an information processing method performed by the information processing apparatus 100 according to the first example embodiment. Note that the processes of Steps S104 to S108 correspond to the preprocessing described above.

First, the acquisition unit 112 acquires a coupling coefficient matrix J (Step S102). Specifically, the acquisition unit 112 may acquire a coupling coefficient matrix J (shown in Expression 1) corresponding to the problem (the combinatorial optimization problem) to be solved by, for example, a user operating the interface unit 108 and inputting it. Alternatively, for example, when a problem to be solved is given, the acquisition unit 112 may calculate the coupling coefficient matrix J corresponding to this problem to be solved.

The eigenvector calculation unit 114 calculates an eigenvector of the coupling coefficient matrix J acquired in the process of S102 (Step S104). Specifically, the eigenvector calculation unit 114 may calculate an eigenvector of the coupling coefficient matrix J by, for example, an Arnoldi method or a QR algorithm. Further, in the first example embodiment, the eigenvector calculation unit 114 may calculate an eigenvector corresponding to the maximum eigenvalue of the coupling coefficient matrix J.

The binary vector generation unit 116 calculates a binary vector corresponding to the eigenvector calculated in the process of S104 (Step S106). Specifically, as expressed by Expression 10, the binary vector generation unit 116 generates, by a sign function sgn, a binary vector σ* having an element of +1 or −1 corresponding to a sign of each of elements of the eigenvector.

The initial state determination unit 118 determines an initial state in a search for a solution of a problem from the binary vector generated in the process of S106 (Step S108). Specifically, as described above, the initial state determination unit 118 uses the generated binary vector σ* as the initial value σ⁰ of the vector σ. That is, the initial state determination unit 118 sets each of the elements of the generated binary vector as an initial value of a binary variable $\sigma_i$.

As described above, the binary vector σ* obtained by the preprocessing is highly likely to be the approximate solution of the original combinatorial optimization problem (Expressions 1 and 2). Thus, the energy H in this case is highly likely to be close to the value in the global optimum solution as compared to the case where the preprocessing is not performed. Therefore, the initial state determination unit 118 determines an appropriate initial value $\beta_i$ of an inverse temperature β in accordance with the energy H corresponding to the initial value (the binary vector σ*) of the binary variable $\sigma_i$. For example, the initial state determination unit 118 may determine $\beta_i$ to be a transient value of β in which the transient value of the energy H when the preprocessing is not used coincides with the value of the energy H in the binary vector σ*. By doing the above, at the inverse temperature $\beta_i$, the value of the energy H in the binary vector σ* that is obtained by performing preprocessing and used as an initial condition can coincide with the transient value of the energy H when the preprocessing is not used. If an appropriate initial value $\beta_i$ described above is not used, σ* used as an initial condition thermally relaxes to a random state, and thus it is necessary to select the appropriate initial value $\beta_i$.

The arithmetic unit 120 executes an annealing algorithm from the initial state determined in S108 (Step S110). Specifically, the arithmetic unit 120 executes a simulated annealing algorithm using, for example, a Monte Carlo method. Note that a commonly used method can be adopted as a method for a simulated annealing algorithm, and thus detailed descriptions thereof are omitted (the same applies to other example embodiments).

In this way, the arithmetic unit 120 probabilistically searches a combination of the binary variables $\sigma_i$ (i.e., the vector σ) in the lowest energy state (the ground state). In other words, the arithmetic unit 120 estimates a spin configuration of the Ising model in the ground state. Although the result of this estimation may not be the spin configuration of the true ground state, the combination of the binary variables $\sigma_i$ (i.e., the vector σ) that becomes closer to the ground state as the value of the energy H of the estimated configuration becomes lower is calculated. Therefore, it can be said that the lower the value of the energy in the result of the estimation of the annealing algorithm performed by the arithmetic unit 120, the higher the accuracy of solving a problem.

The arithmetic result output unit 122 outputs an arithmetic result of the annealing algorithm executed by the process of S110 (Step S112). Specifically, the arithmetic result output unit 122 displays, by, for example, controlling the interface unit 108, the arithmetic result so that a user can visually recognize it. For example, the arithmetic result output unit 122 may display the energy, the combination of the binary variables $\sigma_i$, and the like in the result of the estimation.

<Result of Experiment>

Each of FIGS. 5 to 10 is a diagram for comparing the result of execution of the simulated annealing algorithm in which the initial condition was set by preprocessing according to this example embodiment with the result of execution of the simulated annealing algorithm according to a comparative example. That is, each of FIGS. 5 to 10 is a diagram for comparing the result of execution of the annealing algorithm in the case where the initial state was set from the eigenvector of the coupling coefficient matrix J calculated by the preprocessing according to the first example embodiment with the result of execution of the annealing algorithm in the case where the initial state was randomly chosen using random number generation. In FIGS. 5 to 8, the vertical axis indicates the energy H and the horizontal axis indicates the inverse temperature $\beta$ (corresponding to the elapsed time). Further, a row of round dots indicates the result (the result according to the comparative example) of execution of the simulated annealing algorithm when the initial state was randomly chosen. Further, a row of triangular dots indicates the result (the result according to this example embodiment) of execution of the simulated annealing algorithm when the initial state was chosen from the eigenvector of the coupling coefficient matrix J calculated by the preprocessing.

Note that in the experiments shown in FIGS. 5 to 8, the inverse temperature $\beta$ was changed linearly within a range of 0 to 0.48 for every fixed amount of 0.006. Accordingly, the maximum number of samples is 80. Further, at each temperature, spin updates were attempted N times. Further, a random N×N matrix $K_N$ corresponding to a map problem of a total coupling of N nodes in which each element of the coupling coefficient $J_{ij}$ has a value of +1 or -1 at random was used as a benchmark problem.

Figure 5:
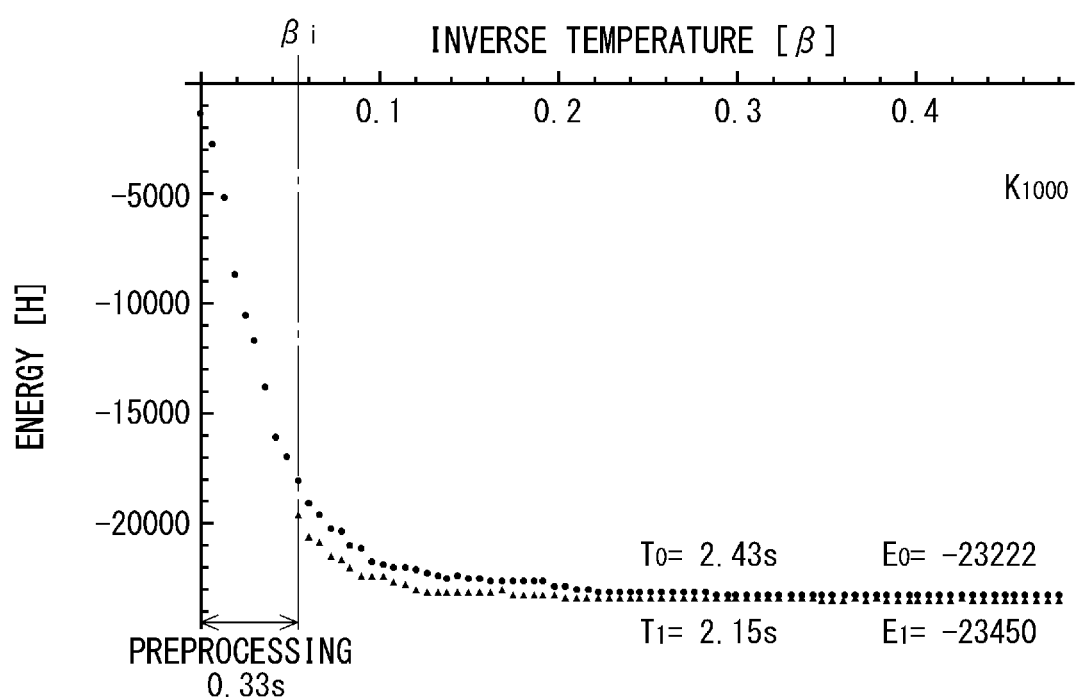
FIG. 5 is a diagram for comparing the result of execution of a simulated annealing algorithm according to the example embodiment in which an initial condition was set by preprocessing with the result of execution of a simulated annealing algorithm according to a comparative example.
Figure 6:
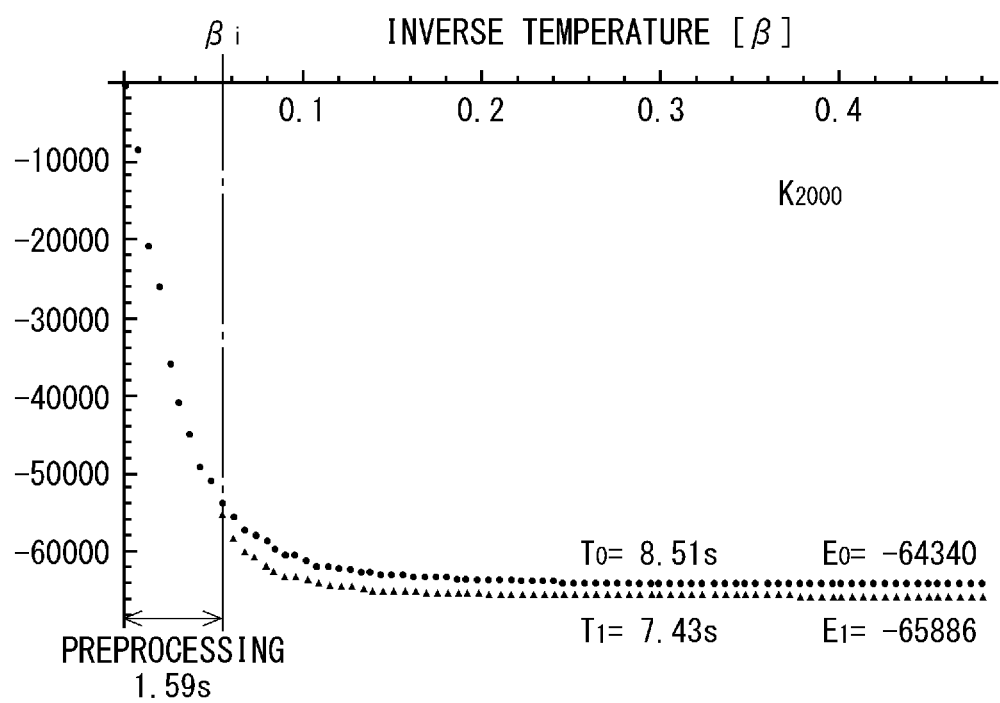
FIG. 6 is a diagram for comparing the result of execution of the simulated annealing algorithm according to the example embodiment in which the initial condition was set by the preprocessing with the result of execution of the simulated annealing algorithm according to the comparative example.
Figure 7:
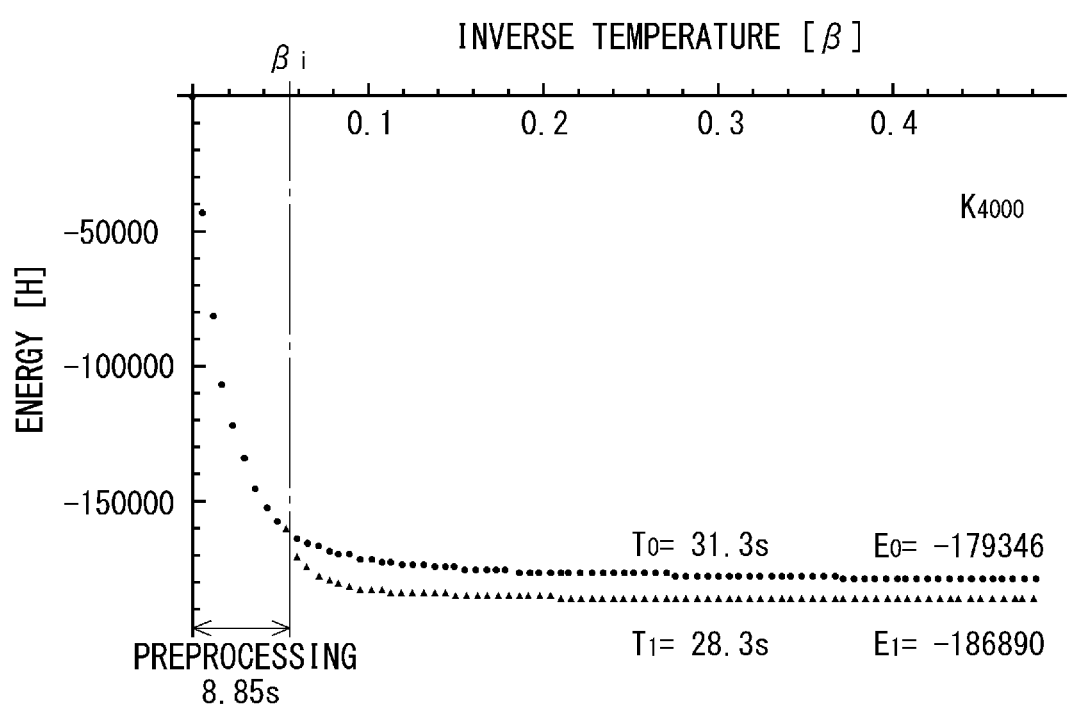
FIG. 7 is a diagram for comparing the result of execution of the simulated annealing algorithm according to the example embodiment in which the initial condition was set by the preprocessing with the result of execution of the simulated annealing algorithm according to the comparative example.
Figure 8:
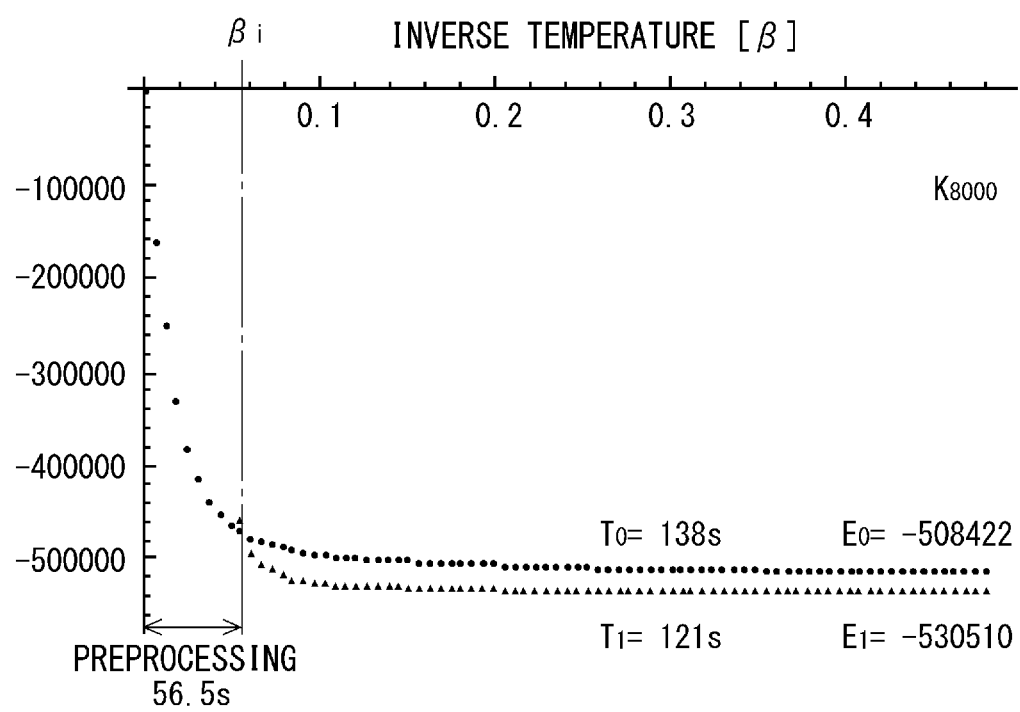
FIG. 8 is a diagram for comparing the result of execution of the simulated annealing algorithm according to the example embodiment in which the initial condition was set by the preprocessing with the result of execution of the simulated annealing algorithm according to the comparative example.

FIG. 5 shows the result of experiment when a random matrix $K_{1000}$ of N=1000 was used as the coupling coefficient matrix J. FIG. 6 shows the result of experiment when a random matrix $K_{2000}$ of N=2000 was used as the coupling coefficient matrix J. FIG. 7 shows the result of experiment when a random matrix $K_{4000}$ of N=4000 was used as the coupling coefficient matrix J. FIG. 8 shows the result of experiment when a random matrix $K_{8000}$ of N=8000 was used as the coupling coefficient matrix J. Note that the lowest energy obtained when the initial state was randomly set by random numbers is set to $E_0$. Further, the lowest energy obtained when the initial state was determined from the eigenvector of the coupling coefficient matrix J calculated by the preprocessing is set to $E_1$. Further, the execution time of the annealing algorithm when the initial state was randomly chosen is set to $T_0$. Further, the execution time of the annealing algorithm when the initial state was set from the eigenvector of the coupling coefficient matrix J calculated by the preprocessing is set to $T_1$. Note that the initial value $\beta_i$ of the inverse temperature $\beta$ hardly depended on the magnitude of N, and was approximately 0.06.

Figure 9:
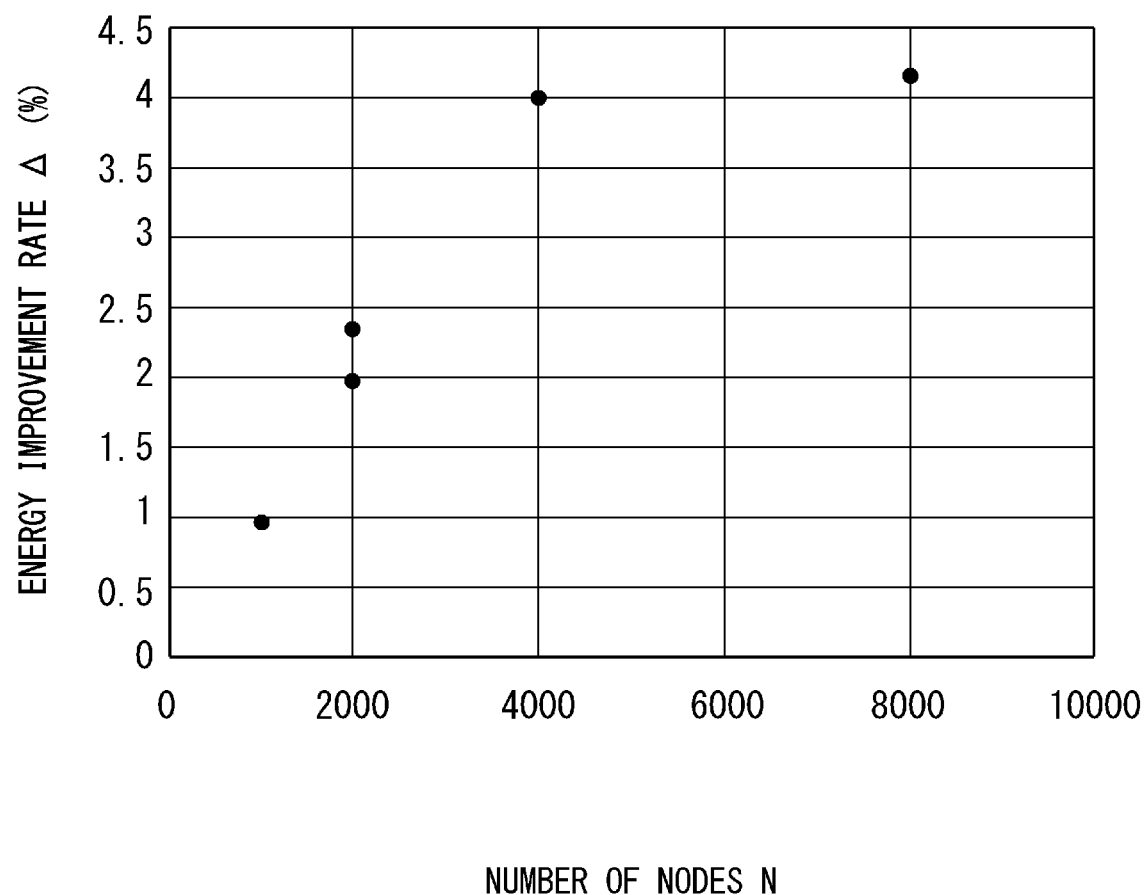
FIG. 9 is a diagram for comparing the result of execution of the simulated annealing algorithm according to the example embodiment in which the initial condition was set by the preprocessing with the result of execution of the simulated annealing algorithm according to the comparative example.

FIG. 9 is a diagram showing an energy improvement ratio $\Delta$ according to the results of experiments shown in FIGS. 5 to 8. The energy improvement rate $\Delta$ [%] is defined by the following Expression 11.

$$\Delta = \frac{E_1 - E_0}{E_1} \times 100 \qquad \text{(Expression 11)}$$

It can be seen from FIG. 9 that the energy improvement ratio $\Delta$ increased as the number N of nodes increased. Thus, the preprocessing according to this example embodiment exhibits its effect as the number of spins (the number of lattice points, i.e., the number of nodes) increases. Note that as shown in FIGS. 5 to 8, as N increased, the time required for preprocessing increased. However, in FIGS. 5 to 8, $T_0 > T_1$. Further, numerous algorithms for calculating eigenvectors of matrices are known, and many studies have been conducted to determine how to reduce the time required for computation. Therefore, the computational overhead required for preprocessing is not very large.

Figure 10:
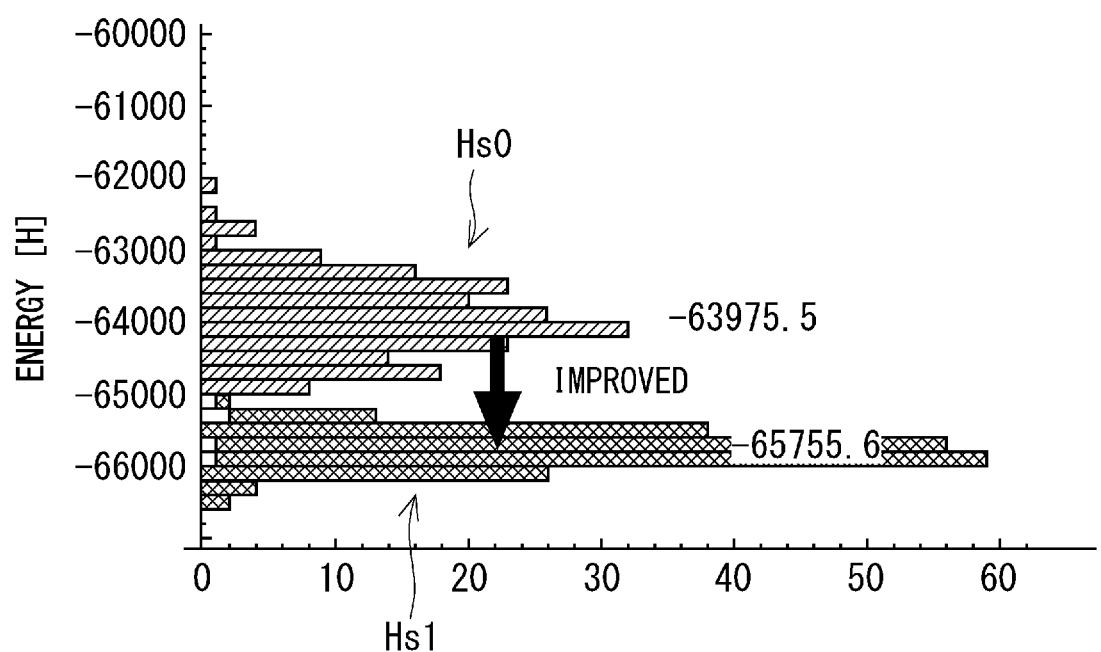
FIG. 10 is diagram for comparing the result of execution of the simulated annealing algorithm according to the example embodiment in which the initial condition was set by the preprocessing with the result of execution of the simulated annealing algorithm according to the comparative example.

FIG. 10 is a histogram showing the distribution of the energy of the arrived solution when an experiment in the simulated annealing algorithm with 200 instances was carried out using the random matrix $K_{2000}$ as the coupling coefficient matrix J. The vertical axis indicates the energy value of the arrived solution, and the horizontal axis indicates the number of instances associated with the energy value. Hs0 is a histogram when the initial state was randomly chosen by random numbers. Hs1 is a histogram when the initial state was set from the eigenvector of the coupling coefficient matrix J calculated by the preprocessing.

As can be seen from FIG. 10, the histogram Hs1 when the preprocessing was used is distributed at the energy lower than that of the histogram Hs0 when the preprocessing was not used. Further, the histogram Hs1 has a distribution width (variations) smaller than that of the histogram Hs0. Therefore, it can be seen that this experiment verified that the accuracy of solving a problem was improved by using the preprocessing.

Note that in the first example embodiment, an eigenvector corresponding to the maximum eigenvalue of the coupling coefficient matrix J is calculated. By this configuration, the accuracy of solving a problem is likely to be higher than when the initial state is determined from the eigenvector corresponding to an eigenvalue other than the maximum eigenvalue.

Second Example Embodiment

Next, a second example embodiment is described. For the clarification of the explanation, the following descriptions and the drawings are partially omitted or simplified as appropriate. Further, the same symbols are assigned to the same elements throughout the drawings, and redundant descriptions are omitted as necessary. The second example embodiment differs from the first example embodiment in that an initial state is determined for each of a plurality of eigenvectors of the coupling coefficient matrix J. Note that the configuration of the information processing apparatus 100 is substantially the same as that of the information processing apparatus 100 according to the first embodiment, and thus the descriptions thereof will be omitted.

Figure 11:
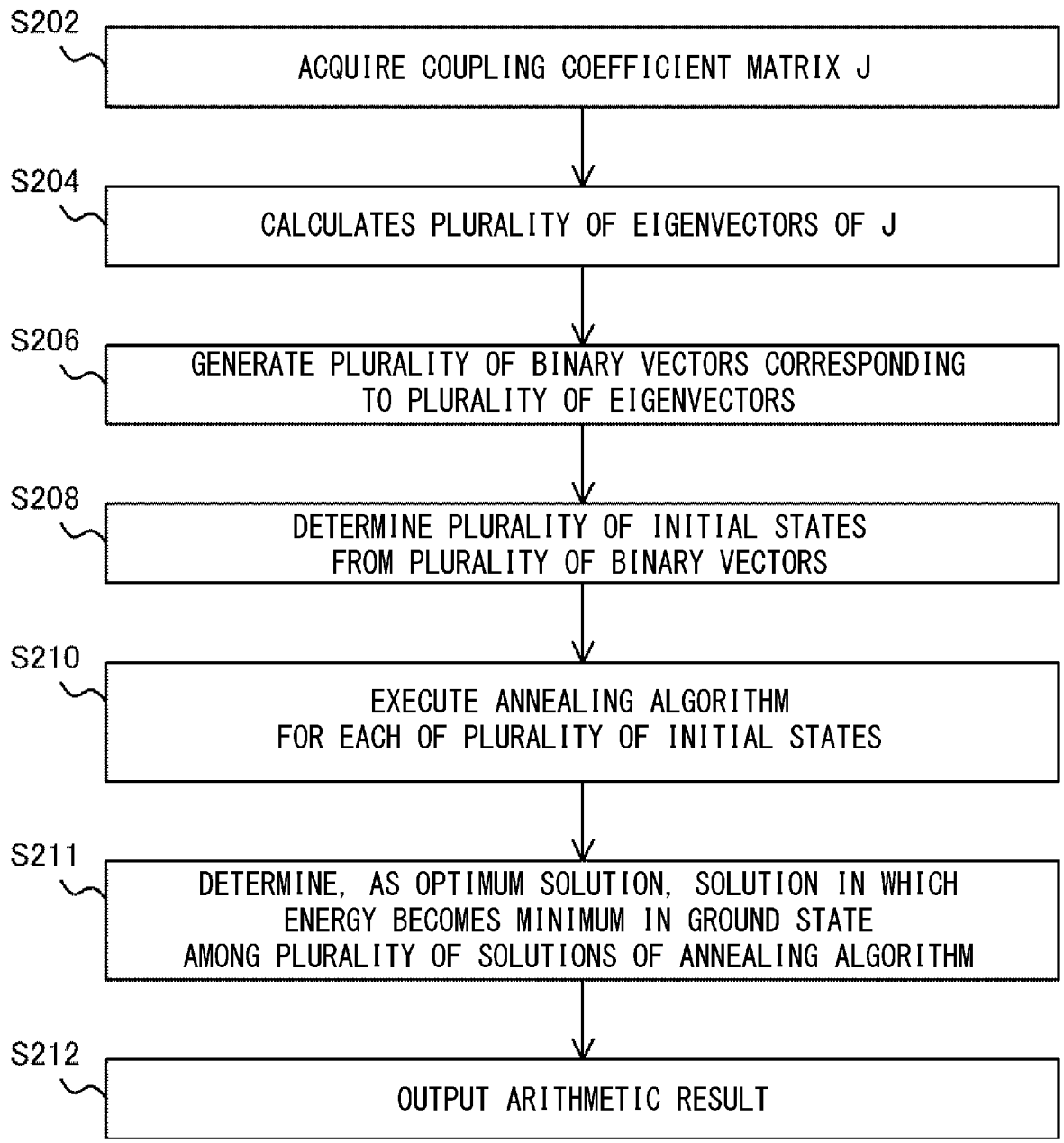
FIG. 11 is a flowchart showing an information processing method performed by an information processing apparatus according to a second example embodiment.

FIG. 11 is a flowchart showing an information processing method performed by the information processing apparatus 100 according to the second example embodiment. Note that the processes of Steps S204 to S208 correspond to the preprocessing described above. First, in the same manner as in that in the process of S102, the acquisition unit 112 acquires a coupling coefficient matrix J (Step S202).

The eigenvector calculation unit 114 calculates a plurality of eigenvectors of the coupling coefficient matrix J acquired in the process of S202 (Step S204). Note that a method for calculating the eigenvector is substantially the same as the method in the process of S104. Specifically, the eigenvector calculation unit 114 may calculate a plurality of eigenvectors corresponding to a predetermined number of respective eigenvalues having large values among a plurality of eigenvalues of the coupling coefficient matrix J. Further, the eigenvector calculation unit 114 may calculate a plurality of eigenvectors corresponding to all of the respective eigenvalues of the coupling coefficient matrix J.

The binary vector generation unit 116 calculates a plurality of binary vectors corresponding to the plurality of respective eigenvectors calculated in the process of S204 (Step S206). Specifically, in the same manner as in that in the process of S106, the binary vector generation unit 116 generates, as expressed by Expression 10, binary vectors $\sigma^*$ having an element of +1 or −1 corresponding to the signs of the respective elements for each of the plurality of eigenvectors by the sign function sgn.

The initial state determination unit 118 determines a plurality of initial states in the search for a solution of a problem from the plurality of the respective binary vectors generated in the process of S206 (Step S208). Specifically, in the same manner as in that in the process of S108, the initial state determination unit 118 uses each of the generated binary vectors $\sigma^*$ as the initial value $\sigma^0$ of the vector $\sigma$. That is, the initial state determination unit 118 determines each element of the generated binary vectors as an initial value of the binary variable $\sigma_i$. Further, in the same manner as in that in the process of S108, the initial state determination unit 118 determines an appropriate initial value $\beta_i$ of an inverse temperature $\beta$ for each of the plurality of binary vectors in accordance with the energy H corresponding to the initial value (the binary vector $\sigma^*$) of the binary variable $\sigma_i$.

The arithmetic unit 120 executes an annealing algorithm for each of the plurality of initial states determined in S208 (Step S210). Specifically, the arithmetic unit 120 executes the simulated annealing algorithm a plurality of times for each of the plurality of initial states. In other words, when M (M is an integer equal to or larger than two) eigenvectors are calculated (i.e., when M initial states are determined), the arithmetic unit 120 executes the simulated annealing algorithm M times. In this way, the arithmetic unit 120 calculates a combination of the binary variables $\sigma_i$ (i.e., the vector $\sigma$) in the lowest energy state (the ground state) for each of the annealing algorithms executed a plurality of times. Note that when the information processing apparatus 100 can execute parallel processing by a plurality of control units 102 or the like, the arithmetic unit 120 may execute the simulated annealing algorithm M times in parallel.

Then, the arithmetic unit 120 determines, as an optimum solution, the solution in which the energy becomes minimum in the ground state among a plurality of solutions (arithmetic results) of the executed annealing algorithm (Step S211). That is, the arithmetic unit 120 determines, as an optimum solution, the solution in which the energy becomes minimum among the M solutions for the simulated annealing algorithm executed M times.

The arithmetic result output unit 122 outputs an arithmetic result of the annealing algorithm (Step S212). In the second example embodiment, the arithmetic result output unit 122 may display the energy, the combination of the binary variables $\sigma_i$, and the like related to the optimum solution estimated in the process of S211.

As described above, the information processing apparatus 100 according to the second example embodiment calculates a plurality of eigenvectors of the coupling coefficient matrix J and executes an annealing algorithm for a plurality of initial states determined based on the plurality of respective eigenvectors. Then, the information processing apparatus 100 according to the second example embodiment determines, as an optimum estimated solution, the solution in which the energy becomes minimum among a plurality of estimated solutions of the executed annealing algorithm. In this way, it is possible to improve the accuracy of solving a problem more than by the method according to the first example embodiment.

As described above, in the first example embodiment, the annealing algorithm is executed using the initial state set in the eigenvector corresponding to the maximum eigenvalue. Thus, as shown in the results of experiment described above, it is possible to improve the accuracy of solving a problem as compared to the case where the preprocessing is not performed. Meanwhile, when the initial state is set to the eigenvector corresponding to the maximum eigenvalue among the plurality of eigenvalues of the coupling coefficient matrix J, the accuracy of solving a problem is not always the highest. Depending on the coupling coefficient matrix J, the accuracy of solving a problem may be highest when the initial state is set to the eigenvector corresponding to an eigenvalue other than the maximum eigenvalue. Therefore, like in the second example embodiment, it is possible to further improve the accuracy of solving a problem by determining, as the optimum solution, the solution in which the energy becomes minimum among the plurality of solutions for the plurality of initial states determined based on the plurality of respective eigenvectors of the coupling coefficient matrix J.

Further, in the solutions of the annealing algorithm executed in the initial states determined in accordance with the plurality of eigenvectors corresponding to eigenvalues having large values among the plurality of eigenvalues of the coupling coefficient matrix J, the energy is highly likely to be low. Thus, by calculating a plurality of eigenvectors corresponding to a predetermined number of respective eigenvalues having large values among the plurality of eigenvalues of the coupling coefficient matrix J, it is possible to further improve the accuracy of solving a problem. Further, by calculating a plurality of eigenvectors corresponding to all of the respective eigenvalues of the coupling coefficient matrix J, an initial state in which the energy becomes minimum is always determined. Therefore, it is possible to further improve the accuracy of solving a problem.

Note that when a plurality of initial states are set in accordance with a plurality of eigenvectors and an annealing algorithm is executed a plurality of times, the processing time required for one problem may become longer. In this case, by executing an annealing algorithm a plurality of times for each of a plurality of initial states in parallel, the accuracy of solving a problem can be improved while preventing the processing time from increasing, although a calculation cost increases.

Modified Example

Note that the present disclosure is not limited to the above-described example embodiments and may be modified as appropriate without departing from the spirit of the present disclosure. For example, in the flowchart described above, the order of each process (step) can be changed appropriately. Further, one or more of a plurality of processes (steps) may be omitted.

Further, in the example embodiments described above, preprocessing is applied to a simulated annealing algorithm. That is, the preprocessing according to the above example embodiments is applied to the annealing algorithm executed by a conventional electronic computer (a classical computer). However, the preprocessing according to the above example embodiments can also be applied to quantum annealing. That is, the preprocessing according to the above example embodiments can also be applied to an annealing process executed in a quantum computer.

In the above-described examples, the program can be stored using any type of non-transitory computer readable media and provided to a computer. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The first and the second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

An information processing apparatus comprising:

calculation means for calculating at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and arithmetic means for executing the annealing algorithm from an initial state determined based on the at least one eigenvector.

(Supplementary Note 2)

The information processing apparatus described in Supplementary note 1, further comprising:

generation means for generating, by a sign function, a binary vector having an element of +1 or −1 corresponding to a sign of each of elements of the at least one eigenvector; and determination means for determining an initial state in a search for a solution of the problem based on the binary vector.

(Supplementary Note 3)

The information processing apparatus described in Supplementary note 2, wherein the determination means determines initial values of the plurality of the binary variables based on the binary vector.

(Supplementary Note 4)

The information processing apparatus described in any one of Supplementary notes 1 to 3, wherein the calculation means calculates the at least one eigenvector corresponding to a maximum eigenvalue of the coupling coefficient matrix.

(Supplementary Note 5)

The information processing apparatus described in any one of Supplementary notes 1 to 3, wherein the calculation means calculates a plurality of the eigenvectors of the coupling coefficient matrix, and the arithmetic means executes an annealing algorithm for a plurality of the initial states determined based on the plurality of the respective eigenvectors and determines, as an optimum solution, a solution in which energy becomes minimum among a plurality of solutions of the executed annealing algorithm.

(Supplementary Note 6)

The information processing apparatus described in Supplementary note 5, wherein the calculation means calculates the plurality of the eigenvectors corresponding to a predetermined number of respective eigenvalues having large values among a plurality of the eigenvalues of the coupling coefficient matrix.

(Supplementary Note 7)

The information processing apparatus described in Supplementary note 5, wherein the calculation means calculates the plurality of the eigenvectors corresponding to all of the respective eigenvalues of the coupling coefficient matrix.

(Supplementary Note 8)

The information processing apparatus described in any one of Supplementary notes 5 to 7, wherein the arithmetic means executes the annealing algorithm for each of the plurality of the initial states in parallel.

(Supplementary Note 9)

An information processing method comprising:

calculating at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and executing the annealing algorithm from an initial state determined based on the at least one eigenvector.

(Supplementary Note 10)

The information processing method described in Supplementary note 9, further comprising:

generating, by a sign function, a binary vector having an element of +1 or −1 corresponding to a sign of each of elements of the at least one eigenvector; and determining an initial state in a search for a solution of the problem based on the binary vector.

(Supplementary Note 11)

The information processing method described in Supplementary note 10, further comprising determining initial values of the plurality of the binary variables based on the binary vector.

(Supplementary Note 12)

The information processing method described in any one of Supplementary notes 9 to 11, further comprising calculating the at least one eigenvector corresponding to a maximum eigenvalue of the coupling coefficient matrix.

(Supplementary Note 13)

The information processing method described in any one of Supplementary notes 9 to 11, further comprising:

calculating a plurality of the eigenvectors of the coupling coefficient matrix, and executing an annealing algorithm for a plurality of the initial states determined based on the plurality of the respective eigenvectors and determines, as an optimum solution, a solution in which energy becomes minimum among a plurality of solutions of the executed annealing algorithm.

(Supplementary Note 14)

The information processing method described in Supplementary note 13, further comprising calculating the plurality of the eigenvectors corresponding to a predetermined number of respective eigenvalues having large values among a plurality of the eigenvalues of the coupling coefficient matrix.

(Supplementary Note 15)

The information processing method described in Supplementary note 13, further comprising calculating the plurality of the eigenvectors corresponding to all of the respective eigenvalues of the coupling coefficient matrix.

(Supplementary Note 16)

The information processing method described in any one of Supplementary notes 13 to 15, further comprising executing the annealing algorithm for each of the plurality of the initial states in parallel.

(Supplementary Note 17)

A program for causing a computer to:

calculate at least one eigenvector of a coupling coefficient matrix including a coupling coefficient indicating a strength of interaction between each of a plurality of binary variables that indicate states of a plurality of respective spins in an Ising model, the coupling coefficient matrix being given in advance in accordance with a problem to be solved by an annealing algorithm; and execute the annealing algorithm from an initial state determined based on the at least one eigenvector.

What is claimed is:

1. An information processing apparatus comprising:
a processor; and
a memory storing program code executable by the processor to:
calculate a plurality of eigenvectors of a coupling coefficient matrix including a coupling coefficient indicating a strength of interaction between each of a plurality of binary variables that indicate states of a plurality of respective spins in an Ising model, the coupling coefficient matrix provided in advance in accordance with a problem to be solved by an annealing algorithm;
determine a plurality of initial states of the annealing algorithm based on the plurality of eigenvectors, respectively;
execute the annealing algorithm for each of the plurality of initial states in parallel, to generate a plurality of solutions of the problem; and
determine an optimum solution in which energy becomes minimum, from among the plurality of solutions,
wherein calculation of the eigenvectors ensures that one of the initial states will result in the energy becoming the minimum in the solution of the problem for which the annealing algorithm has been executed for the one of the initial states, such that accuracy in solving the problem is improved,
and wherein executing the annealing algorithm for each of the plurality of initial states in parallel prevents processing time from increasing while the accuracy in solving the problem is improved.

2. The information processing apparatus according to claim 1, wherein the program code is executable by the processor to further:
generate, by a sign function, a plurality of binary vectors respectively corresponding to the plurality of eigenvectors, each binary vector having a plurality of elements, each element being +1 or −1 in correspondence with a sign of a corresponding element of a corresponding eigenvector,
wherein the initial states of the annealing algorithm are determined based on the plurality of binary vectors.

3. The information processing apparatus according to claim 2, wherein initial values of the plurality of the binary variables are determined based on the plurality of binary vectors.

4. The information processing apparatus according to claim 1, wherein the plurality of eigenvectors that are calculated include an eigenvector corresponding to a maximum eigenvalue of the coupling coefficient matrix.

5. The information processing apparatus according to claim 1, wherein the plurality of the eigenvectors that are calculated include eigenvectors corresponding to a predetermined number of the plurality of eigenvalues of the coupling coefficient matrix that have values greater than a threshold.

6. The information processing apparatus according to claim 1, wherein the plurality of the eigenvectors that are calculated include eigenvectors corresponding to all of the plurality of eigenvalues of the coupling coefficient matrix.

7. An information processing method comprising:
calculating, by a processor, a plurality of eigenvectors of a coupling coefficient matrix including a coupling coefficient indicating a strength of interaction between each of a plurality of binary variables that indicate states of a plurality of respective spins in an Ising model, the coupling coefficient matrix provided in advance in accordance with a problem to be solved by an annealing algorithm;
determining, by the processor, a plurality of initial states of the annealing algorithm based on the plurality of eigenvectors, respectively;
executing, by the processor, the annealing algorithm for each of the plurality of initial states in parallel, to generate a plurality of solutions of the problem; and
determining, by the processor, an optimum solution in which energy becomes minimum, from among the plurality of solutions,
wherein calculation of the eigenvectors ensures that one of the initial states will result in the energy becoming the minimum in the solution of the problem for which the annealing algorithm has been executed for the one of the initial states, such that accuracy in solving the problem is improved,
and wherein executing the annealing algorithm for each of the plurality of initial states in parallel prevents processing time from increasing while the accuracy in solving the problem is improved.

8. The information processing method according to claim 7, further comprising:

generating, by the processor using a sign function, a plurality of binary vectors respectively corresponding to the plurality of eigenvectors, each binary vector having a plurality of elements, each element being +1 or −1 in correspondence with a sign of a corresponding element of a corresponding eigenvector, wherein the initial states of the annealing algorithm are determined based on the plurality of binary vectors.

9. The information processing method according to claim 8, further comprising determining initial values of the plurality of the binary variables based on the plurality of binary vectors.

10. The information processing method according to claim 7, wherein the plurality of eigenvectors that are calculated include an eigenvector corresponding to a maximum eigenvalue of the coupling coefficient matrix.

11. The information processing method according to claim 7, wherein the plurality of the eigenvectors that are calculated include eigenvectors corresponding to a predetermined number of the plurality of eigenvalues of the coupling coefficient matrix that have values greater than a threshold.

12. The information processing method according to claim 7, wherein the plurality of the eigenvectors that are calculated include eigenvectors corresponding to all of the plurality of eigenvalues of the coupling coefficient matrix.

13. A non-transitory computer readable medium storing a program that is executable by a computer to:

calculate a plurality of eigenvectors of a coupling coefficient matrix including a coupling coefficient indicating a strength of interaction between each of a plurality of binary variables that indicate states of a plurality of respective spins in an Ising model, the coupling coefficient matrix provided in advance in accordance with a problem to be solved by an annealing algorithm;

determine a plurality of initial states of the annealing algorithm based on the plurality of eigenvectors, respectively;

execute the annealing algorithm for each of the plurality of initial states in parallel, to generate a plurality of solutions of the problem; and determine an optimum solution in which energy becomes minimum, from among the plurality of solutions, wherein calculation of the eigenvectors ensures that one of the initial states will result in the energy becoming the minimum in the solution of the problem for which the annealing algorithm has been executed for the one of the initial states, such that accuracy in solving the problem is improved, and wherein executing the annealing algorithm for each of the plurality of initial states in parallel prevents processing time from increasing while the accuracy in solving the problem is improved.

* * * * *